(12) United States Patent
Knapp

(10) Patent No.: US 6,657,540 B2
(45) Date of Patent: Dec. 2, 2003

(54) SYSTEM AND METHOD FOR MONITORING TIRE LOCATION ON A VEHICLE

(75) Inventor: Stephen E. Knapp, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 74 days.

(21) Appl. No.: 10/042,853

(22) Filed: Jan. 7, 2002

(65) Prior Publication Data

US 2003/0128108 A1 Jul. 10, 2003

(51) Int. Cl.⁷ .......................... B60Q 7/00; B60C 23/00; B60C 23/02
(52) U.S. Cl. ................ 340/442; 340/438; 340/443; 340/445; 340/447; 73/146.5
(58) Field of Search ............................. 340/442, 438, 340/443, 445, 447; 73/146.5

(56) References Cited

U.S. PATENT DOCUMENTS

| | | | |
|---|---|---|---|
| 5,600,301 A | 2/1997 | Robinson, III | 340/442 |
| 5,774,047 A | 6/1998 | Hensel, IV | 340/442 |
| 5,838,229 A * | 11/1998 | Robinson, III | 340/442 |
| 6,204,758 B1 * | 3/2001 | Wacker et al. | 340/444 |
| 6,259,361 B1 * | 7/2001 | Robillard et al. | 340/447 |
| 6,278,363 B1 * | 8/2001 | Bezek et al. | 340/442 |
| 6,414,592 B1 * | 7/2002 | Dixit et al. | 340/447 |
| 6,489,888 B1 * | 12/2002 | Honeck et al. | 340/442 |
| 6,518,876 B1 * | 2/2003 | Marguet et al. | 340/447 |

* cited by examiner

Primary Examiner—Jeffery Hofsass
Assistant Examiner—Lam Pham
(74) Attorney, Agent, or Firm—S. Kevin Pickens; Kevin D. Wills

(57) ABSTRACT

A system and method for monitoring the location of each of a plurality of tires that are selectively and rotatably attached to a vehicle. A plurality of monitors are placed on the vehicle either within the air compartment of tire or proximate to the tire, monitoring either the air pressure or rotation of one of the plurality of tires, and transmitting the monitoring data to a receiving module in the vehicle. The receiving module determines if a tire attachment location-changing event has occurred on the vehicle based upon a change in tire pressure or a predetermined sequence of tire rotation, and preferably requests input of new tire locations on the vehicle.

18 Claims, 1 Drawing Sheet

SYSTEM AND METHOD FOR MONITORING TIRE LOCATION ON A VEHICLE

BACKGROUND OF THE INVENTION

1. Field of the Invention

The present invention generally relates to automobiles and vehicle monitoring systems. More particularly, the present invention relates to a system and method to monitor the tires of the vehicle and detect a potential change of the tire attachment locations.

2. Description of the Related Art

In vehicles that use inflatable tires, it is desirous to periodically rotate the location of the tire on the vehicle so that the tires on the vehicle evenly wear. Thus, tires are rotated from front to rear, from side to side, or both to promote even wear. In such case, a tire which originally was identified to the operator as being located, for example, on the left front of the vehicle may now be located on the right rear and a system which identifies tire location would now indicate a tire problem at the wrong location to the vehicle operator. In the past, a mechanic has either kept written or computer records of the rotation of location of the tires on a vehicle so that the tires are properly rotated. There are several automated and semi-automated systems that attempt to determine the locations of the tires on the vehicle for proper rotation.

One system for indicating low tire pressure in vehicles uses a transmitter within each wheel, and the transmitter has a unique code. In that system, a central receiver is placed in the vehicle at manufacture which recognizes the codes for the respective transmitters in each wheel of the vehicle, and also a common transmitter code, in the event one of the transmitters needs to be replaced. An application specific integrated circuit (ASIC) encoder is included in each transmitter and is programmed at manufacture, in accordance with its unique code, to send its information at different intervals, to avoid clash between two or more transmitters on the vehicle. The transmitters must be powered by long-life batteries, and during vehicle operation and maintenance, when the tires are rotated, that system can be recalibrated to relearn the locations of the transmitters The disadvantage with that system is that the technician may forget to perform the procedure or perform the procedure incorrectly so that accurate tire location data is not maintained. This results in incorrect and misleading data being displayed to the driver or the mechanic. Once the data is incorrect, one cannot properly rotate the tires based upon the system information.

Other systems use multiple antennas (one per wheel) to determine where each tire is located, and often, the vehicle must be driven before the location determination can be made. These types of systems sense tire pressure through pressure sensors mounted in each tire that transmit tire pressure information to a central receiver. The receiver typically includes a means for identifying the location of each tire, and the system automatically informs the vehicle operator of the location of any tire that falls below a predetermined pressure level. The pressure responsive switch is almost always within the tire or attached to the pressure valve, and may be responsive to a fluctuation at any predetermined pressure level.

The multi-antennae approach has several significant problems. First, the upfront installation costs from higher material and labor due to the complex antenna system are substantial. Second, there is an "information lag" in the time between a tire loosing pressure and the switch being activated, such that the driver may still drive on a substantially flat tire. Further, any subsequent new tire placed on the vehicle must have the antenna placed within it and the system must be reset for the new tire.

Aside from measuring current data of the vehicle's tires, a tire monitoring system also must identify and track the position of the tires from the initial installation through tire rotations and tire replacement. This positional data is important since the driver must know which tire needs to be serviced at the given intervals. When the tires are rotated or the spare is brought into service the tire monitoring system must recognize the tires have changed position so as not to display the old, incorrect tire position.

Specific tire attachment location monitoring systems exist using both simple and complex technologies. In one system, a strong magnet is manually placed on each tire, near magnetic-switch sensors that monitor the location of the tires through identifying the location of each magnet. The magnets can be reattached to new tires as they are placed on the vehicle. This system however requires a manual step of having the operator or service personnel place a magnet on each tire, and also requires the tire-mounted transmitter to include a magnetic switch as part of the mechanism, thereby adding to the cost, reliability and complexity of the overall system.

Another tire pressure monitoring system identifies tire locations by recognizing that certain characteristics are unique to front-located tires verses rear-located tires as well as left-side tires and right-side tires. The system uses a control circuit coupled to a temperature sensor and an accelerometer for each tire to receive information that discriminates between left and right and front and rear tires, respectively. With this information and a pressure signal, the monitoring system provides the operator with tire location and pressure information without reprogramming upon tire rotation. The system also alerts the operator to run-flat tire operational constraints. Although, the sensors and computing power necessary to effect this system are significantly complex and add great cost in manufacturing and installation.

In sum, the maintenance of an accurate record to tire rotation location on a vehicle typically falls upon a specific individual with written records, such as a mechanic. Extant automated tire location monitoring systems tend to be complex and expensive, and require exact interaction, typically with service personnel or by an operator sufficiently skilled to reprogram the tire location, so that the monitoring system can recognize the new location of a tire. There exists a need, therefore, for a robust system which properly records the location rotation of tires on a vehicle, and such system should be simple to implement and inexpensive to install. It is to the provision of such an improved system and method for monitoring the tire location changing events on a vehicle that the present invention is primarily directed.

DETAILED DESCRIPTION OF THE INVENTION

Figure 1:
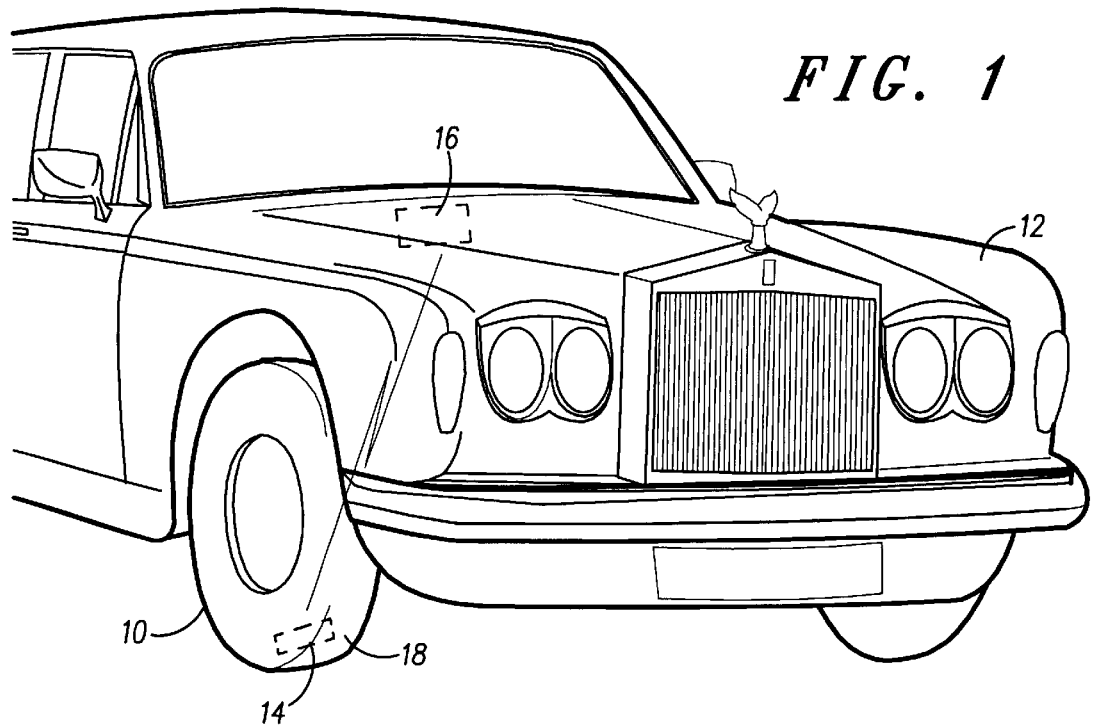
FIG. 1 is a cut-away view of an inflatable tire on a vehicle, and the tire has an air pressure monitor mounted inside the tire's air compartment.

With reference to the figures in which like numerals represent like elements throughout, FIG. 1 is a is a cut-way view of an inflatable tire 10 on a vehicle 12, and the tire 10 has a monitor 14 in wireless communication to a receiving module 16 mounted in the vehicle 12. The monitor 14 is shown mounted inside the air compartment 18 of the tire 10 and transmitting data relative to a pressure change within the air compartment 18 to the receiving module 16. The receiving module 16 receives the data from the monitor 14, preferably for each tire 10 of the vehicle 12 and determines if a tire location-changing event has occurred on the vehicle based upon a pressure drop in the tire 10. The receiving module 16 is preferably embodied to have the original tire location input so that it can monitor tire location changes. However, the receiving module 16 can simply keep a current location of tires stored and have the driver or user input new tire locations after a tire location-changing event, as is described herein.

The embodiment of the air pressure sensitive monitor 14 in FIG. 1 utilizes the knowledge that the tire 10 on the vehicle 12 carries the weight of the vehicle 12, which compresses the tire 10 when the vehicle 12 is in normal operation, to determine when a tire location-changing event has occurred. This compression results in a slightly higher pressure compared to an unloaded tire, such as when the tire 10 is jacked off the ground or the vehicle 10 is on a lift. The monitor 14 needs sufficient resolution to detect the pressure change when the tire 10 is raised off the ground and will transmit this data to the receiving module 16. The monitor 16 would periodically read the pressure in all the tires often enough to ensure receiving data during the course of a tire change or wheel rotation.

The receiving module 16 processes the pressure data and detects if a tire attachment location changing event has occurred, such as the vehicle 12 having one tire 10 have a drop in pressure due to jacking of the vehicle 12 in order to change a flat tire. If the receiving module 16 does not detect a tire location-changing event, such as "raised tire" event, then the tire 10 has not changed their attachment position and the current tire locations are true. However, if a tire location-changing event is detected, such as a "raised tire" event, is detected then the receiving module 16 would infer the tire 10 has changed position and would need to re-establish the correct tire location or request data from the driver as to the correct tire positions. Thus, the receiving module 16, upon determining that a tire location changing event has occurred, can requests input of the change of tire locations on the vehicle 12 of each of the plurality of tires.

Figure 2:
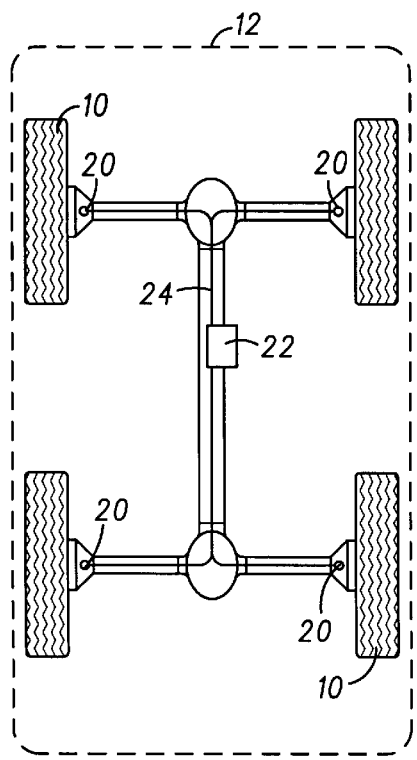
FIG. 2 is a top view of a plurality of tires as is common in a vehicle with a plurality of monitors, and each monitor is mounted proximate to a tire and is in wired connection with the receiving module in the vehicle.

A second embodiment of the system for monitoring the location of each of a plurality of inflatable tires 10 is shown in FIG. 2. This embodiment uses the knowledge that each tire 10 is selectively rotatably attached to a vehicle 12, and during a tire change or tire location rotation, each tire tends to move independently of the other tires on the vehicle. A plurality of monitors 20 are thus placed on the vehicle 12, typically on the chassis thereof, proximate to each tire 10. Each monitor 20 monitors the rotation of one of the plurality of tires 10, and each monitor 20 transmits data relative to tire rotation to the receiving module 22. In this embodiment, the receiving module 22 determines if a tire location-changing event has occurred on the vehicle based upon a predetermined sequence of tire rotation. Thus, each monitor 20 is a motion sensor, which can be an accelerometer, rotation, or a lateral translation sensor. The receiving module 22 receives data on each of the tires' motion, and compares the data for all tires 10 to determine if a tire location-changing event has occurred. If tire movement were not consistent with a rolling vehicle, such as an individual tire's isolated rotation, then the receiving module 22 would infer a tire 10 has changed position and the receiving module 22 or other control system would need to reestablish the correct tire location or request data to be input from the driver to obtain and store the correct tire positions.

In the embodiment of FIG. 2, the plurality of monitors 20 are in communication with the receiving module 22 through wires 24, which can be placed on the vehicle chassis or in other locations of the vehicle 12. The wire 24 conducts electrical signals from the plurality of monitors 20 relative to tire 10 rotation while the tire 10 is rotatably attached to the vehicle. However, the tire rotation monitors 20 can alternately be in wired communication with the receiving module 22, similarly to the tire pressure monitor 14 and receiving module 16 in FIG. 1.

Moreover, either embodiment of the monitor, either tire pressure monitor 14 or tire rotation monitor 20, can be placed within the air compartment 18 of the tire 10, as shown in FIG. 1, or proximate to the tire 10 as shown in FIG. 2. Both a tire pressure monitor 14 and tire rotation monitor 20 can be used on the same tire 10 and provide both pressure and rotation data to a common receiving module 16,20. Further, it is preferable that a tire pressure monitor 14 be placed either within the air compartment 18 of the tire 10 or on the valve of the tire 10 so that the most accurate reading of the tire pressure can be had. It should also be noted that if the tire 10 is not inflatable, the tire rotation monitor 20 can be used to determine when the non-inflatable tires have been rotated in their attachment to the vehicle 12.

Figure 3:
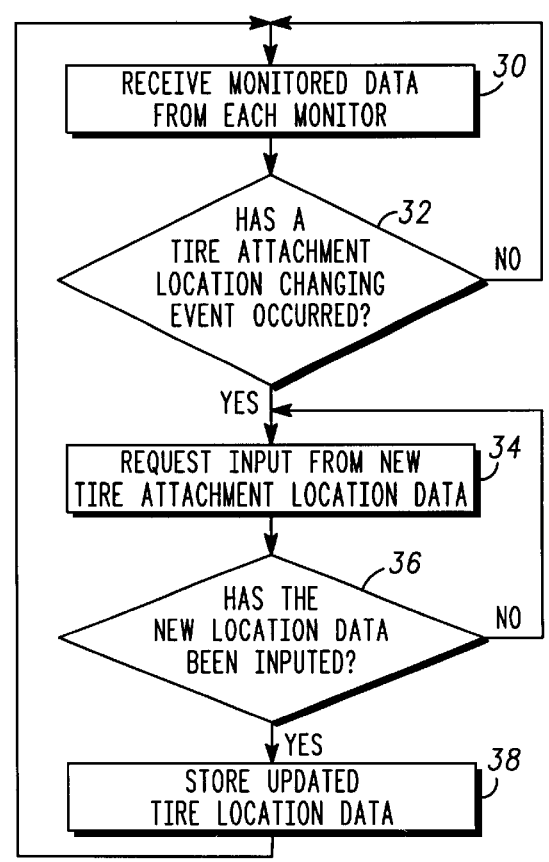
FIG. 3 is a flowchart illustrating the process executing on the receiving module wherein the module receives the data from the plurality of monitors and determines if a tire location-changing event has occurred on the vehicle.

The process executing on the receiving module 16,22 is shown in the flowchart of FIG. 3. The tire 10 monitoring data is receiving from each monitor 14,20 tire pressure and/or rotation data, as shown at step 30. A decision is then made as to whether a tire attachment location-changing event has occurred based upon the input data, as shown at decision 32. If the data does not indicate a tire location-changing event at decision 32, then the process returns to receive the monitored tire data at step 30. If a tire location-changing event is indicated at decision 32, then the input of the new tire attachment location data is requested from the user, as shown at step 34. Step 34 is optional as it is assumed that the receiving module 16,22 will also store the tire location data. However, upon determining that a tire-location changing event has occurs at decision 32, the receiving module 16,22 can simply send a signal to another system or otherwise affirmatively indicate the detection of the event to the driver.

After the new tire attachment location data has been requested from the user at step 34, a determination is made as to whether the new tire location data has been input, as shown at decision 36. If it is indicated at decision 34 that the new tire location data has not been input, the process again returns to step 34 to request the user input the data and enters a wait-state to ensure the update. As embodied, the system must constantly require new tire location data upon any tire location-changing event occurring because if the system allows even one event to pass without updating the location of the tires, then the location monitoring is lost. And if it is indicated that the new tire location data has been input at decision 36, then the updated tire location data is stored, as shown at step 38, and the process returns to receiving the tire data from the monitors 14,20 at step 30, and monitor for another tire location-changing event.

The system accordingly provides an inventive method for monitoring the location of each of a plurality of tires 10 on a vehicle 12 having the steps of placing a plurality of monitors 14,20 on the vehicle 12, where each monitor 14,20 is either within the air compartment 18 of the tire 10 or proximate to one of the plurality of tires. The method continues with the steps of monitoring at each monitor 14,20 the air pressure or rotation of one of the plurality of tires 10, and transmitting the monitored data to a receiving module 16,22 in the vehicle 12, and determining at the receiving module 16,22 if a tire location changing event has occurred on the vehicle based upon a change in tire pressure or predetermined sequence of tire rotation. The method preferably includes the step of requesting, at the receiving module 16,22, after a determination that a tire location-changing event has occurred, the input of the change of tire locations on the vehicle of each of the plurality of tires.

If embodied to detect tire rotation as shown in FIG. 2, the step of determining at the receiving module 22 if a tire location changing event has occurred is determining if a tire location-changing event has occurred based upon the individual rotation of one of the plurality of tires 10 on the vehicle 12. Further, the step of transmitting data relative to the air pressure or rotation of each of the plurality of tires 10 can transmitting the data from plurality of monitors 14 to the receiving module 16 through wireless communication as shown in FIG. 1, or transmitting the data from plurality of monitors 20 to the receiving module 22 through wired communication as shown in FIG. 2.

The present tire monitoring system accordingly provides an advantage in that a tire location-changing event will be detected and the tire location data must be updated in the system so that the tire location data remains accurate. Furthermore, the monitors 14,20 can periodically monitor the tires 10 in a predetermined time frame, such as every 2 minutes, such that each monitoring period will encompass a tire location-changing event. Such periodic monitoring requires less power on an isolated monitor, such as air pressure monitor 14 within the tire 10, which allows the monitor to use less battery power. And the receiving module 16,22 can be constructed of simple, inexpensive electronic components and the computational power necessary to execute the monitoring process is minimal and the module can be quite small and easily placed within a vehicle 12. Thus, the present system is inexpensive to install on vehicles 12 either during the manufacturing process or within the active life of the vehicle 12.

While there has been shown a preferred and alternate embodiments of the present invention, it is to be understood that certain changes may be made in the forms and arrangement of the elements and steps of the method without departing from the underlying spirit and scope of the invention as is set forth in the claims.

What is claimed is:

1. A system for monitoring the location of each of a plurality of inflatable tires having an interior air compartment containing air therein under pressure, and each tire selectively rotatably attached to a vehicle, the system comprising:

a plurality of monitors, each monitor monitoring the air pressure in the air compartment of one of the plurality of tires, and each monitor transmitting data relative to a pressure change within the air compartment; and a receiving module that receives the data from the plurality of monitors and determines if a tire location changing event has occurred on the vehicle based on the pressure change to establish the location of each of the plurality of tires.

2. The system of claim 1, wherein the receiving module, upon determining that a tire location changing event has occurred, requests input of the change of tire locations on the vehicle of each of the plurality of tires.

3. The system of claim 1, wherein the plurality of monitors are in wireless communication with the receiving module.

4. The system of claim 1, wherein the plurality of monitors are in wired communication with the receiving module.

5. The system of claim 1, wherein each of the plurality of monitors is located within a respective inflatable tire.

6. The system of claim 1, wherein each of the plurality of monitors is located proximate to a respective inflatable tire.

7. A system for monitoring the location of each of a plurality of inflatable tires having an interior air compartment containing air therein under pressure, and each tire selectively rotatably attached to a vehicle, the system comprising:

a plurality of monitors, each monitor monitoring the rotation of one of the plurality of tires, and each monitor transmitting data relative to tire rotation; and a receiving module that receives the data from the plurality of monitors and determines if a tire location changing event has occurred on the vehicle based upon a predetermined sequence of tire rotation to establish the location of each of the plurality of tires.

8. The system of claim 7, wherein the receiving module determine if a tire location changing event has occurred based upon the individual rotation of one of the plurality of tires on the vehicle.

9. The system of claim 7, wherein the receiving module, upon determining that a tire location changing event has occurred, requests input of the change of tire locations on the vehicle of each of the plurality of tires.

10. The system of claim 7, wherein the plurality of monitors are in wireless communication with the receiving module.

11. The system of claim 7, wherein the plurality of monitors are in wired communication with the receiving module.

12. The system of claim 7, wherein each of the plurality of monitors is located within a respective inflatable tire.

13. The system of claim 7, wherein each of the plurality of monitors is located proximate to a respective inflatable tire.

14. A method for monitoring the location of each of a plurality of tires, and each tire selectively rotatably attached to a vehicle, the method comprising the steps of:

placing a plurality of monitors on the vehicle, each monitor proximate to one of the plurality of tires;

monitoring at each monitor the rotation of one of the plurality of tires;

transmitting data relative to the rotation of each of the plurality of tires to a receiving module in the vehicle; and determining at the receiving module if a tire location changing event has occurred on the vehicle based upon a predetermined sequence of tire rotation to establish the location of each of the plurality of tires.

15. The method of claim 14, wherein the step of determining at the receiving module if a tire location changing event has occurred is determining if a tire location changing event has occurred based upon the individual rotation of one of the plurality of tires on the vehicle.

16. The method of claim 14, further comprising the step of requesting, at the receiving module, after a determination that a tire location changing event has occurred, the input of the change of tire locations on the vehicle of each of the plurality of tires.

17. The method of claim 14, wherein the step of transmitting data relative to the rotation of each of the plurality of tires is transmitting the data from plurality of monitors to the receiving module through wireless communication.

18. The method of claim 14, wherein the step of transmitting data relative to the rotation of each of the plurality of tires is transmitting the data from plurality of monitors to the receiving module through wired communication.

\* \* \* \* \*